US012609740B2

(12) United States Patent
Hakola et al.

(10) Patent No.: US 12,609,740 B2
(45) Date of Patent: Apr. 21, 2026

(54) USE OF TRANSMISSION CONFIGURATION INDICATION STATE SUBSETS FOR WIRELESS COMMUNICATION

(71) Applicant: Nokia Technologies Oy, Espoo (FI)

(72) Inventors: Sami-Jukka Hakola, Kempele (FI); Mihai Enescu, Espoo (FI); Timo Koskela, Oulu (FI)

(73) Assignee: Nokia Technologies Oy, Espoo (FI)

( * ) Notice: Subject to any disclaimer, the term of this patent is extended or adjusted under 35 U.S.C. 154(b) by 644 days.

(21) Appl. No.: 18/006,346

(22) PCT Filed: Jun. 28, 2021

(86) PCT No.: PCT/FI2021/050496
§ 371 (c)(1),
(2) Date: Jan. 20, 2023

(87) PCT Pub. No.: WO2022/029367
PCT Pub. Date: Feb. 10, 2022

(65) Prior Publication Data
US 2023/0299824 A1 Sep. 21, 2023

Related U.S. Application Data

(60) Provisional application No. 62/706,312, filed on Aug. 7, 2020.

(51) Int. Cl.
H04B 7/06 (2006.01)

(52) U.S. Cl.
CPC ......... H04B 7/0617 (2013.01); H04B 7/0691 (2013.01)

(58) Field of Classification Search
CPC .. H04B 7/0617; H04B 7/0691; H04B 7/0602; H04L 5/0023; H04L 5/0048
(Continued)

(56) References Cited

U.S. PATENT DOCUMENTS

| 11,497,021 B2 * | 11/2022 | Onggosanusi | ........ H04W 72/23 |
| 11,888,559 B2 * | 1/2024 | Xu | ........ H04B 7/0695 |

(Continued)

FOREIGN PATENT DOCUMENTS

| WO | 2019/193581 A2 | 10/2019 |
| WO | 2020/143909 A1 | 7/2020 |
| WO | 2020/144637 A1 | 7/2020 |

OTHER PUBLICATIONS

"New WID: Further enhancements on MIMO for NR", 3GPP TSG RAN Meeting #86, RP-193133, Agenda: 9.1.1, Samsung, Dec. 9-12, 2019, 5 pages.
(Continued)

*Primary Examiner* — Juan A Torres
(74) *Attorney, Agent, or Firm* — Lippes Mathias LLP

(57) ABSTRACT

A method may include measuring, by a user device in a wireless network, a plurality of downlink reference signals received from a network node, wherein the plurality of downlink reference signals are associated with a group of transmission configuration indication (TCI) states that may be used at least for uplink communication by the user device; determining, by the user device based at least on the measuring, a plurality of subsets of the downlink reference signals, wherein the TCI states associated with any one subset of the plurality of subsets of downlink reference signals may be activated at a time by the user device for uplink transmission; and sending, by the user device to the network node, a measurement report that indicates one or more downlink reference signals for each subset of the plurality of subsets.

20 Claims, 7 Drawing Sheets

(58) Field of Classification Search
USPC .......................................... 455/101, 91, 103
See application file for complete search history.

(56) References Cited

U.S. PATENT DOCUMENTS

| | | | | |
|---|---|---|---|---|
| 2019/0222289 | A1 | 7/2019 | John Wilson et al. | |
| 2020/0229161 | A1* | 7/2020 | Raghavan | H04W 24/10 |
| 2020/0358505 | A1* | 11/2020 | Park | H04B 7/088 |
| 2022/0021436 | A1* | 1/2022 | Zhang | H04B 7/0695 |
| 2022/0109541 | A1* | 4/2022 | Cirik | H04L 5/0048 |
| 2022/0158805 | A1* | 5/2022 | Frenne | H04L 5/0053 |
| 2022/0304028 | A1* | 9/2022 | Bagheri | H04W 72/1273 |
| 2023/0198721 | A1* | 6/2023 | Gao | H04L 5/0082 |
| | | | | 370/329 |
| 2023/0319839 | A1* | 10/2023 | Nilsson | H04L 5/0091 |
| | | | | 370/329 |

OTHER PUBLICATIONS

"3rd Generation Partnership Project; Technical Specification Group Radio Access Network; NR; Physical layer procedures for data (Release 16)", 3GPP TS 38.214, V16.1.0, Mar. 2020, pp. 1-151.

"3rd Generation Partnership Project; Technical Specification Group Radio Access Network; NR; Multiplexing and channel coding (Release 16)", 3GPP Ts 38.212, V16.1.0, Mar. 2020, pp. 1-146.

"3rd Generation Partnership Project; Technical Specification Group Radio Access Network; NR; Radio Resource Control (RRC) protocol specification (Release 16)", 3GPP TS 38.331, V16.0.0, Mar. 2020, pp. 1-835.

International Search Report and Written Opinion received for corresponding Patent Cooperation Treaty Application No. PCT/FI2021/050496, dated Nov. 11, 2021, 17 pages.

"UE Power Saving in MIMO operation", 3GPP TSG RAN WG1 NR #95, R1-1813358, Agenda: 7.2.9.2.1, Motorola Mobility, Nov. 12-16, 2018, pp. 1-3.

* cited by examiner

Example Wireless Network 130

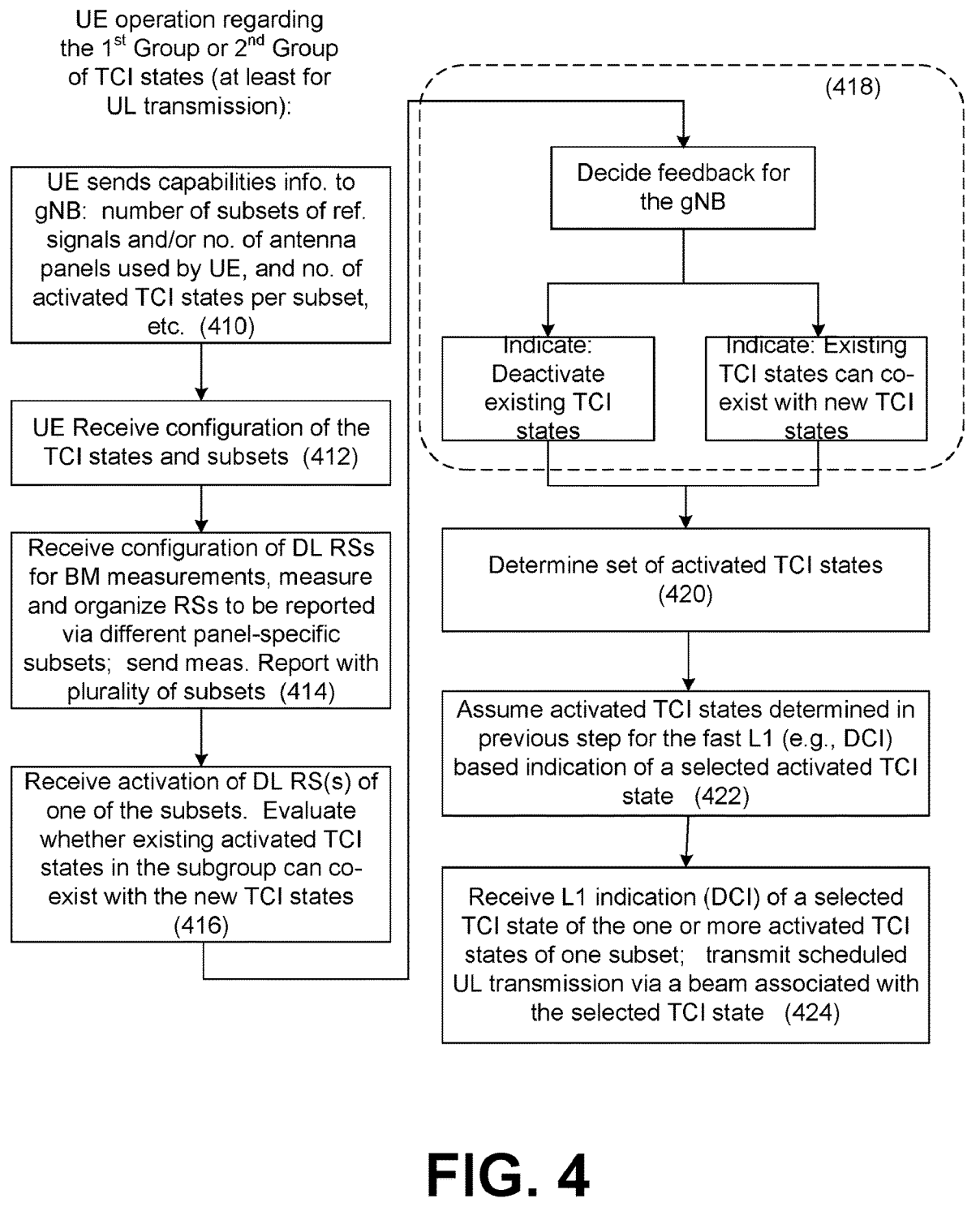

UE operation regarding
the 1st Group or 2nd Group
of TCI states (at least for
UL transmission):

UE sends capabilities info. to gNB: number of subsets of ref. signals and/or no. of antenna panels used by UE, and no. of activated TCI states per subset, etc. (410)

UE Receive configuration of the TCI states and subsets (412)

Receive configuration of DL RSs for BM measurements, measure and organize RSs to be reported via different panel-specific subsets; send meas. Report with plurality of subsets (414)

Receive activation of DL RS(s) of one of the subsets. Evaluate whether existing activated TCI states in the subgroup can co-exist with the new TCI states (416)

(418)

Decide feedback for the gNB

Indicate: Deactivate existing TCI states

Indicate: Existing TCI states can co-exist with new TCI states

Determine set of activated TCI states (420)

Assume activated TCI states determined in previous step for the fast L1 (e.g., DCI) based indication of a selected activated TCI state (422)

Receive L1 indication (DCI) of a selected TCI state of the one or more activated TCI states of one subset; transmit scheduled UL transmission via a beam associated with the selected TCI state (424)

FIG. 4

Figure 5:
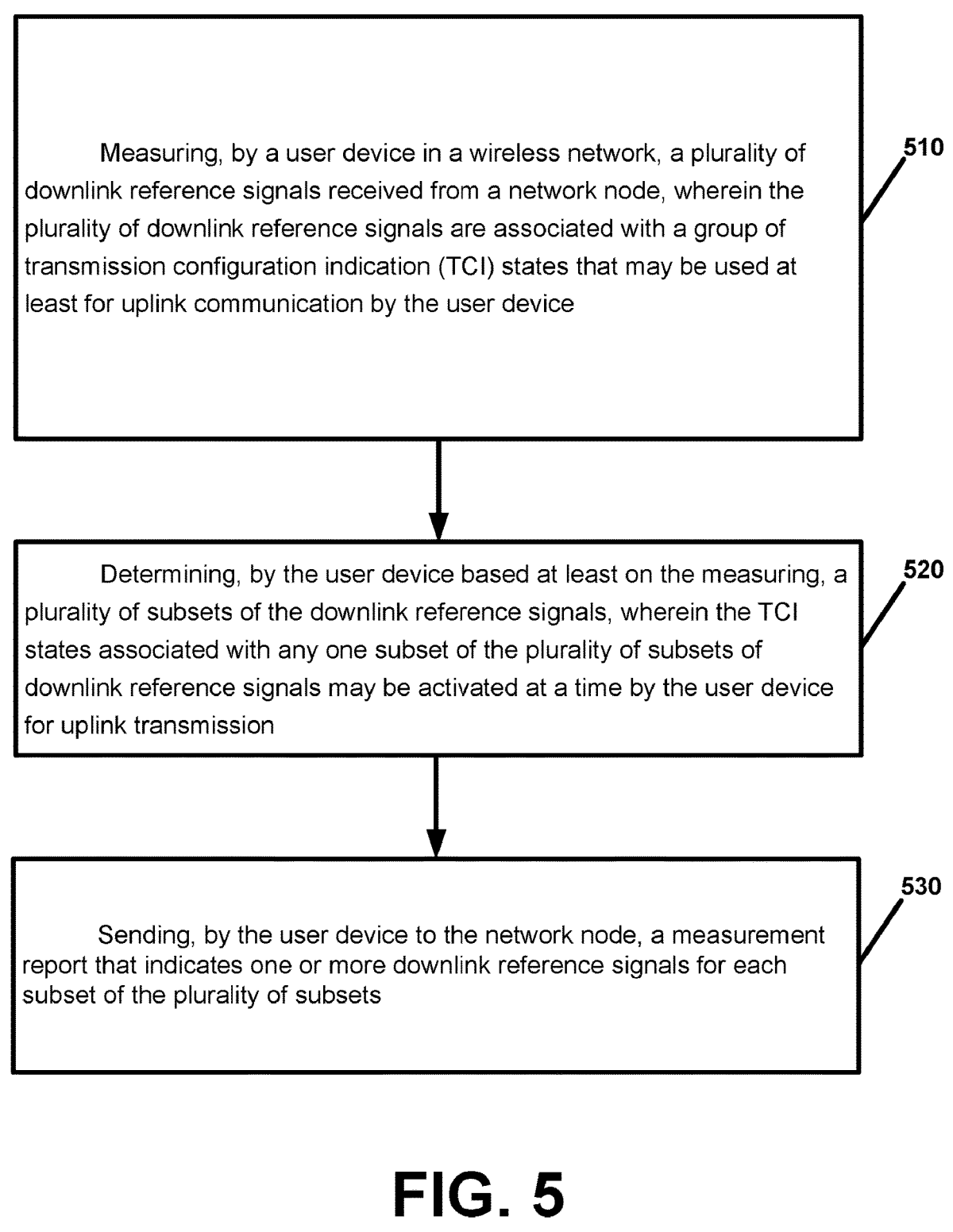

Measuring, by a user device in a wireless network, a plurality of downlink reference signals received from a network node, wherein the plurality of downlink reference signals are associated with a group of transmission configuration indication (TCI) states that may be used at least for uplink communication by the user device

510

Determining, by the user device based at least on the measuring, a plurality of subsets of the downlink reference signals, wherein the TCI states associated with any one subset of the plurality of subsets of downlink reference signals may be activated at a time by the user device for uplink transmission

520

Sending, by the user device to the network node, a measurement report that indicates one or more downlink reference signals for each subset of the plurality of subsets

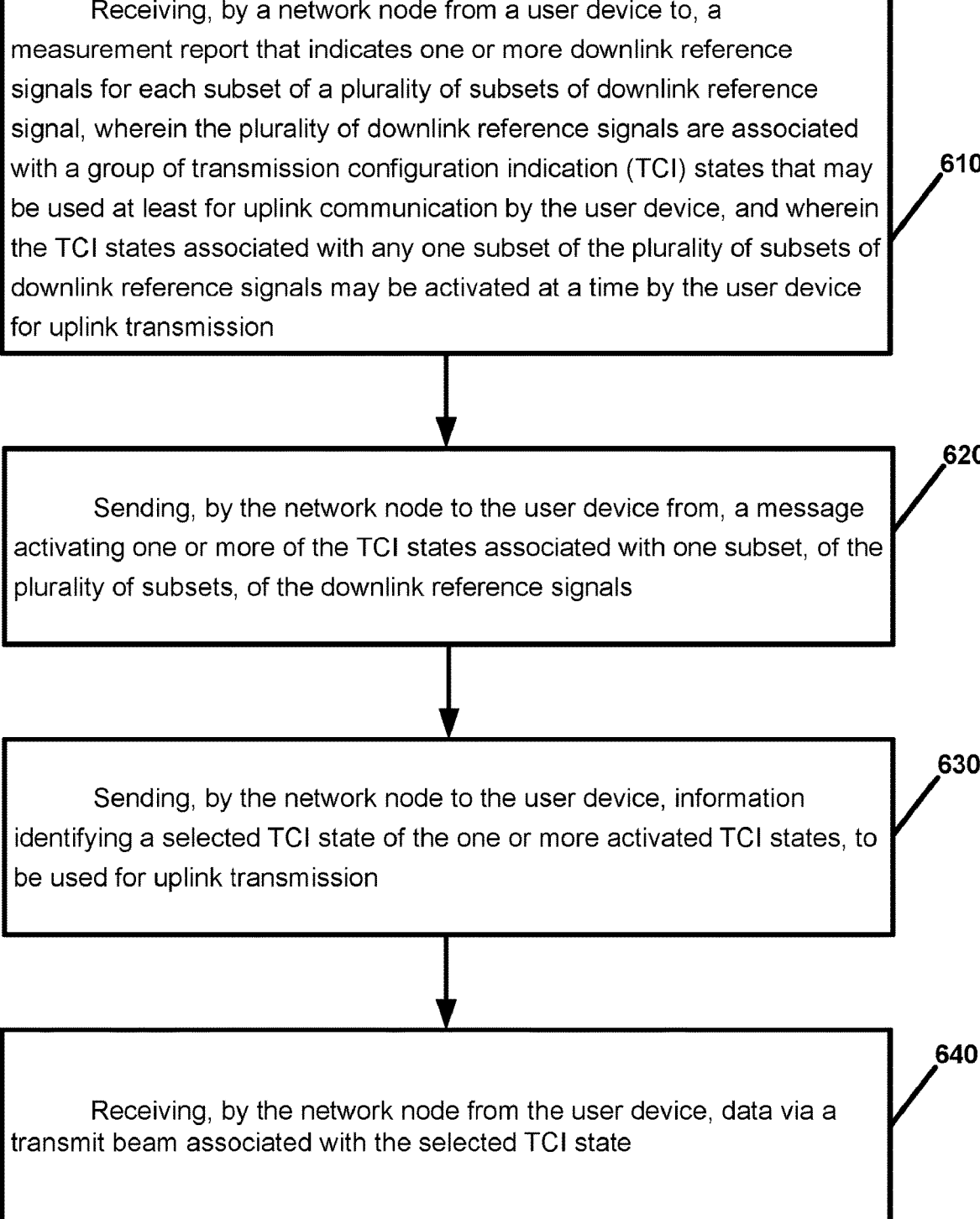

Receiving, by a network node from a user device to, a measurement report that indicates one or more downlink reference signals for each subset of a plurality of subsets of downlink reference signal, wherein the plurality of downlink reference signals are associated with a group of transmission configuration indication (TCI) states that may be used at least for uplink communication by the user device, and wherein the TCI states associated with any one subset of the plurality of subsets of downlink reference signals may be activated at a time by the user device for uplink transmission

610

Sending, by the network node to the user device from, a message activating one or more of the TCI states associated with one subset, of the plurality of subsets, of the downlink reference signals

620

Sending, by the network node to the user device, information identifying a selected TCI state of the one or more activated TCI states, to be used for uplink transmission

630

Receiving, by the network node from the user device, data via a transmit beam associated with the selected TCI state

USE OF TRANSMISSION CONFIGURATION INDICATION STATE SUBSETS FOR WIRELESS COMMUNICATION

RELATED APPLICATION

This application was originally filed as PCT Application No. PCT/FI2021/050496, filed on Jun. 28, 2021, which claims priority from U.S. Provisional Application No. 62/706,312, filed on Aug. 7, 2020, each of which is incorporated herein by reference in its entirety.

TECHNICAL FIELD

This description relates to wireless communications.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the 3rd Generation Partnership Project (3GPP). A recent development in this field is often referred to as the long-term evolution (LTE) of the Universal Mobile Telecommunications System (UMTS) radio-access technology. E-UTRA (evolved UMTS Terrestrial Radio Access) is the air interface of 3GPP's Long Term Evolution (LTE) upgrade path for mobile networks. In LTE, base stations or access points (APs), which are referred to as enhanced Node AP (eNBs), provide wireless access within a coverage area or cell. In LTE, mobile devices, or mobile stations are referred to as user equipments (UE). LTE has included a number of improvements or developments. Aspects of LTE are also continuing to improve.

5G New Radio (NR) development is part of a continued mobile broadband evolution process to meet the requirements of 5G, similar to earlier evolution of 3G & 4G wireless networks. In addition, 5G is also targeted at the new emerging use cases in addition to mobile broadband. A goal of 5G is to provide significant improvement in wireless performance, which may include new levels of data rate, latency, reliability, and security. 5G NR may also scale to efficiently connect the massive Internet of Things (IoT) and may offer new types of mission-critical services. For example, ultra-reliable and low-latency communications (URLLC) devices may require high reliability and very low latency.

SUMMARY

According to some aspects, there is provided the subject matter of the independent claims. Some further aspects are defined in the dependent claims. Some example embodiments are listed in the Summary section. The embodiments that do not fall under the scope of the claims are to be interpreted as examples useful for understanding the disclosure.

According to an example embodiment, a method may include: measuring, by a user device in a wireless network, a plurality of downlink reference signals received from a network node, wherein the plurality of downlink reference signals are associated with a group of transmission configuration indication (TCI) states that may be used at least for uplink communication by the user device; determining, by the user device based at least on the measuring, a plurality of subsets of the downlink reference signals, wherein the TCI states associated with any one subset of the plurality of subsets of downlink reference signals may be activated at a time by the user device for uplink transmission; and sending, by the user device to the network node, a measurement report that indicates one or more downlink reference signals for each subset of the plurality of subsets.

According to an example embodiment, a method may include: receiving, by a network node from a user device to, a measurement report that indicates one or more downlink reference signals for each subset of a plurality of subsets of downlink reference signal, wherein the plurality of downlink reference signals are associated with a group of transmission configuration indication (TCI) states that may be used at least for uplink communication by the user device, and wherein the TCI states associated with any one subset of the plurality of subsets of downlink reference signals may be activated at a time by the user device for uplink transmission; sending, by the network node to the user device from, a message activating one or more of the TCI states associated with one subset, of the plurality of subsets, of the downlink reference signals; sending, by the network node to the user device, information identifying a selected TCI state of the one or more activated TCI states, to be used for uplink transmission; and receiving, by the network node from the user device, data via a transmit beam associated with the selected TCI state.

Other example embodiments are provided or described for each of the example methods, including: means for performing any of the example methods; a non-transitory computer-readable storage medium comprising instructions stored thereon that, when executed by at least one processor, are configured to cause a computing system to perform any of the example methods; and an apparatus including at least one processor, and at least one memory including computer program code, the at least one memory and the computer program code configured to, with the at least one processor, cause the apparatus at least to perform any of the example methods.

The details of one or more examples of embodiments are set forth in the accompanying drawings and the description below. Other features will be apparent from the description and drawings, and from the claims.

BRIEF DESCRIPTION OF THE DRAWINGS

FIG. 4 is a diagram illustrating operation of a user device according to an example embodiment.

FIG. 5 is a flow chart illustrating operation of a user device according to an example embodiment.

FIG. 6 is a flow chart illustrating operation of a network node according to an example embodiment.

DETAILED DESCRIPTION

Figure 1:
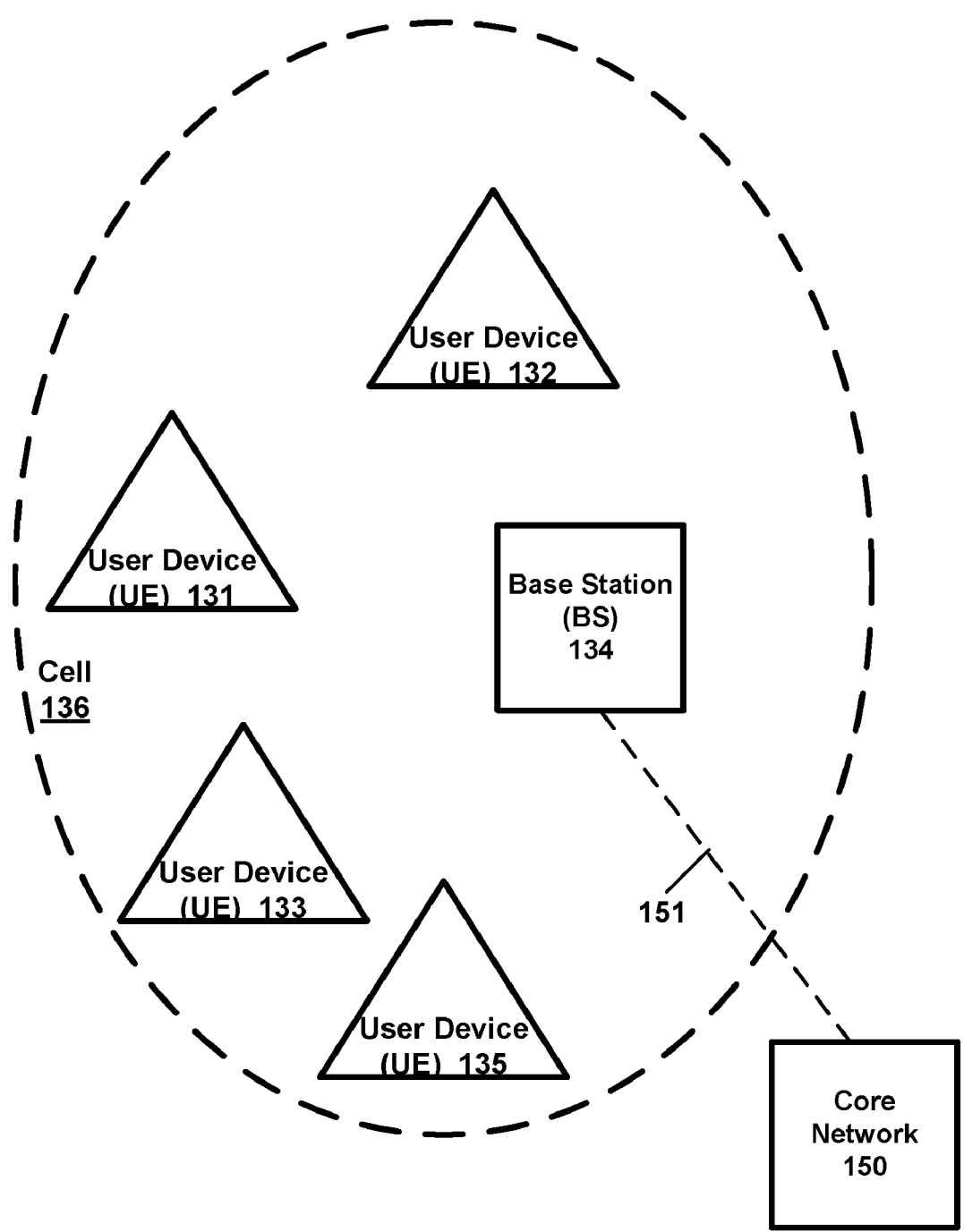
FIG. 1 is a block diagram of a wireless network according to an example embodiment.

FIG. 1 is a block diagram of a wireless network 130 according to an example embodiment. In the wireless network 130 of FIG. 1, user devices 131, 132, 133 and 135, which may also be referred to as mobile stations (MSs) or user equipment (UEs), may be connected (and in communication) with a base station (BS) 134, which may also be referred to as an access point (AP), an enhanced Node B (eNB), a gNB or a network node. The terms user device and user equipment (UE) may be used interchangeably. A BS may also include or may be referred to as a RAN (radio access network) node, and may include a portion of a BS or a portion of a RAN node, such as (e.g., such as a centralized unit (CU) and/or a distributed unit (DU) in the case of a split BS or split gNB). At least part of the functionalities of a BS (e.g., access point (AP), base station (BS) or (e)Node B (eNB), gNB, RAN node) may also be carried out by any node, server or host which may be operably coupled to a transceiver, such as a remote radio head. BS (or AP) 134 provides wireless coverage within a cell 136, including to user devices (or UEs) 131, 132, 133 and 135. Although only four user devices (or UEs) are shown as being connected or attached to BS 134, any number of user devices may be provided. BS 134 is also connected to a core network 150 via a S1 interface 151. This is merely one simple example of a wireless network, and others may be used.

A base station (e.g., such as BS 134) is an example of a radio access network (RAN) node within a wireless network. A BS (or a RAN node) may be or may include (or may alternatively be referred to as), e.g., an access point (AP), a gNB, an eNB, or portion thereof (such as a centralized unit (CU) and/or a distributed unit (DU) in the case of a split BS or split gNB), or other network node.

According to an illustrative example, a BS node (e.g., BS, eNB, gNB, CU/DU, . . . ) or a radio access network (RAN) may be part of a mobile telecommunication system. A RAN (radio access network) may include one or more BSs or RAN nodes that implement a radio access technology, e.g., to allow one or more UEs to have access to a network or core network. Thus, for example, the RAN (RAN nodes, such as BSs or gNBs) may reside between one or more user devices or UEs and a core network. According to an example embodiment, each RAN node (e.g., BS, eNB, gNB, CU/DU, . . . ) or BS may provide one or more wireless communication services for one or more UEs or user devices, e.g., to allow the UEs to have wireless access to a network, via the RAN node. Each RAN node or BS may perform or provide wireless communication services, e.g., such as allowing UEs or user devices to establish a wireless connection to the RAN node, and sending data to and/or receiving data from one or more of the UEs. For example, after establishing a connection to a UE, a RAN node (e.g., BS, eNB, gNB, CU/DU, . . . ) may forward data to the UE that is received from a network or the core network, and/or forward data received from the UE to the network or core network. RAN nodes (e.g., BS, eNB, gNB, CU/DU, . . . ) may perform a wide variety of other wireless functions or services, e.g., such as broadcasting control information (e.g., such as system information) to UEs, paging UEs when there is data to be delivered to the UE, assisting in handover of a UE between cells, scheduling of resources for uplink data transmission from the UE(s) and downlink data transmission to UE(s), sending control information to configure one or more UEs, and the like. These are a few examples of one or more functions that a RAN node or BS may perform.

A user device (user terminal, user equipment (UE), mobile terminal, handheld wireless device, etc.) may refer to a portable computing device that includes wireless mobile communication devices operating either with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, a vehicle, a sensor, and a multimedia device, as examples, or any other wireless device. It should be appreciated that a user device may also be (or may include) a nearly exclusive uplink only device, of which an example is a camera or video camera loading images or video clips to a network.

In LTE (as an illustrative example), core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks. Other types of wireless networks, such as 5G (which may be referred to as New Radio (NR)) may also include a core network.

In addition, by way of illustrative example, the various example embodiments or techniques described herein may be applied to various types of user devices or data service types, or may apply to user devices that may have multiple applications running thereon that may be of different data service types. New Radio (5G) development may support a number of different applications or a number of different data service types, such as for example: machine type communications (MTC), enhanced machine type communication (eMTC), Internet of Things (IoT), and/or narrowband IoT user devices, enhanced mobile broadband (eMBB), and ultra-reliable and low-latency communications (URLLC). Many of these new 5G (NR)—related applications may require generally higher performance than previous wireless networks.

IoT may refer to an ever-growing group of objects that may have Internet or network connectivity, so that these objects may send information to and receive information from other network devices. For example, many sensor type applications or devices may monitor a physical condition or a status, and may send a report to a server or other network device, e.g., when an event occurs. Machine Type Communications (MTC, or Machine to Machine communications) may, for example, be characterized by fully automatic data generation, exchange, processing and actuation among intelligent machines, with or without intervention of humans. Enhanced mobile broadband (eMBB) may support much higher data rates than currently available in LTE.

Ultra-reliable and low-latency communications (URLLC) is a new data service type, or new usage scenario, which may be supported for New Radio (5G) systems. This enables emerging new applications and services, such as industrial automations, autonomous driving, vehicular safety, e-health services, and so on. 3GPP targets in providing connectivity with reliability corresponding to block error rate (BLER) of $10^{-5}$ and up to 1 ms U-Plane (user/data plane) latency, by way of illustrative example. Thus, for example, URLLC user devices/UEs may require a significantly lower block error rate than other types of user devices/UEs as well as low latency (with or without requirement for simultaneous high reliability). Thus, for example, a URLLC UE (or URLLC application on a UE) may require much shorter latency, as compared to a eMBB UE (or an eMBB application running on a UE).

The various example embodiments may be applied to a wide variety of wireless technologies or wireless networks, such as LTE, LTE-A, 5G (New Radio (NR)), cmWave, and/or mmWave band networks, IoT, MTC, eMTC, eMBB, URLLC, etc., or any other wireless network or wireless technology. These example networks, technologies or data service types are provided only as illustrative examples.

Figure 2:
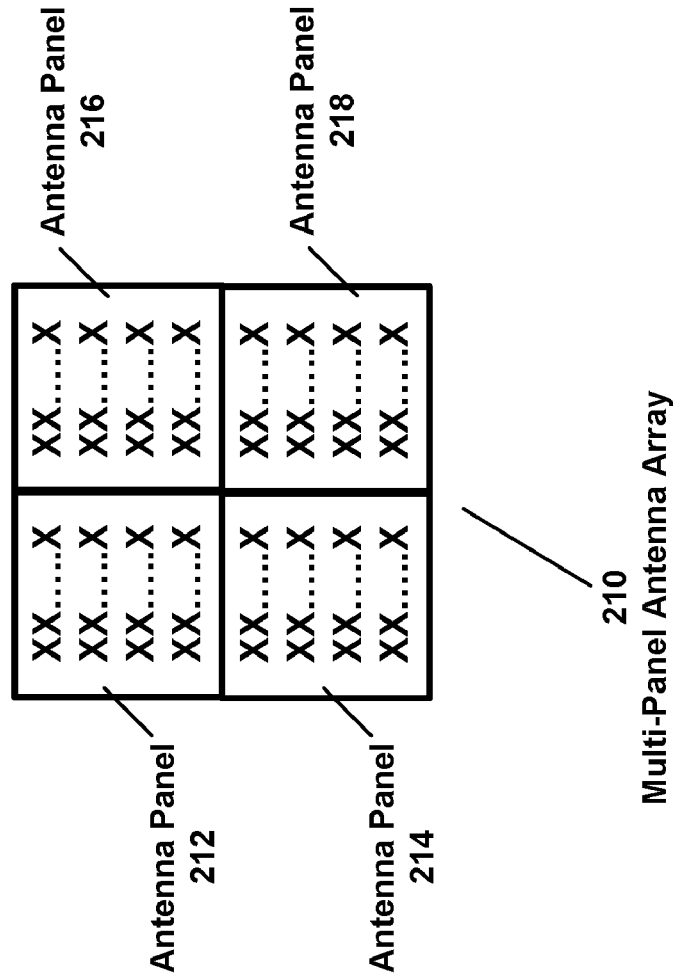
FIG. 2 is a diagram illustrating a multi-panel antenna array according to an example embodiment.

According to an example embodiment, a UE (e.g., user device, or user terminal) and/or a BS (e.g., gNB, or eNB) may each include a multiple panel (or multi-panel) antenna array. FIG. 2 is a diagram illustrating a multi-panel antenna array according to an example embodiment. Multi-panel antenna array 210 may be used by or provided for a UE, for example. According to an example embodiment, multi-panel antenna array 210 may include a plurality (e.g., a few, or tens or even hundreds) of antenna elements (each antenna element indicated by "X" in FIG. 2) configured into multiple antenna panels, such as for antenna panels 212, 214, 216 and 218, as an illustrative example. While multi-panel antenna array 210 in FIG. 2 includes four antenna panels, any number of antenna panels may be provided or used (e.g., by a UE or a BS). Each antenna panel may generate a beam or perform beamforming, based on a set of beam weights applied to antenna elements of the antenna panel. In an example embodiment, each antenna panel may include one or more wireless transceivers (transmitter/receiver). For example, for each antenna panel, a transceiver may be provided for each of one or more polarizations (e.g., which may include, for example, one or both of azimuth polarization or elevation polarization, as examples). An antenna panel may either be active (or activated) or inactive (or inactive or not activated). In an example of an inactive state of an antenna panel, power is usually not applied to the transceiver(s) of the antenna panel (e.g., to conserve power). Also, in an example inactive state of an antenna panel, a set of beam weights may not be applied to the antenna elements, and the inactive antenna panel does not perform beamforming or generate a beam for transmission or reception. On the other hand, according to an illustrative example of an active (or activated) state of an antenna panel, power is typically applied to the antenna panel transceiver(s) (to power on the panel transceivers). Thus, for example, when an antenna panel is active, the wireless transceiver(s) (e.g., including the power amplifier, PA) for the antenna panel are typically powered on, and/or a set of beam weights (e.g., each weight including an amplitude and phase) may be applied to the antenna elements so that the antenna panel may generate a beam (beamforming), e.g., to allow a signal to be transmitted or received via the generated beam. These are merely some illustrative examples of one or more features or characteristics of an inactive (or not activated) antenna panel, and of an active (or activated) antenna panel, and other examples of these may be used or provided.

To transmit and/or receive a signal via a beam generated (or beamformed) by an antenna panel, the antenna panel must first be activated (or placed in an active state), if not already active. According to an example embodiment, switching between an inactive panel and an active panel may, for example, include activating an inactive panel (so that such panel is now active), and/or de-activating an active panel (so that such panel is now inactive), to allow the UE (or other device) to now use the previously inactive panel, which has now been activated, for beamforming. In this manner, the UE may switch from using a first antenna panel to a second antenna panel, e.g., for beamforming for transmission or reception of a signal. According to an example embodiment, to switch (or transition) an antenna panel from an inactive state to an active (or activated) state, the UE may apply power to (or power on) the one or more transceivers (transmitter/receivers) of the antenna panel, and/or apply a set of beam weights to the antenna elements of the antenna panel.

A UE may have one or more active antenna panels at a time. According to an example embodiment, depending on UE capabilities, multiple antenna panels may, for example, allow a UE to simultaneously form both transmitter beamforming (where a beam is formed for the transmission of a signal) via a first antenna panel and receiver beamforming (where a beam is formed for the reception of a signal) via a second antenna panel. Thus, depending on the capabilities of a UE, a UE with multiple antenna panels may (at least in some cases) be capable of, e.g., simultaneously transmitting and receiving via separate antenna panels, transmitting a signal(s) via two or more antenna panels, and/or receiving signals via two or more antenna panels. Alternatively, at least in some cases, e.g., to conserve power, a UE may have only one antenna panel active (or activated) at a time, which may be used for transmitting or receiving. Thus, in an example embodiment, there may be one active antenna panel, or multiple, active antenna panels, depending on UE capabilities. As noted, panel switching from an active antenna panel to an inactive antenna panel may introduce significant delay or latency (due to panel activation delay), since the inactive panel should be activated before it can be used by the UE to transmit or receive a signal.

Also, for example, a UE may have one or more active receive panels at the same time, and may have one active transmit panel. At a particular time, one or more panels may be allocated or activated to be used for downlink communication (receiving a signal) communication only, or for uplink communication only.

In some cases, a UE may perform panel switching, which may include, e.g., switching between panels for uplink and/or downlink communication and/or activating an inactive panel. For example, it may be advantageous for a UE to be able to transmit and/or receive different signals via either a same antenna panel, or transmit and/or receive various signals via different antenna panels, depending on the situation. Also, a BS (gNB or other network node) may request a UE to perform certain operations (transmit and/or receive specific signals) via one or more specific antenna panel (e.g., same panel) and/or via different antenna panels. Thus, in some cases, a UE may need to switch between panels, such as switching (for UE signal transmission or reception) from an active antenna panel to an inactive panel (e.g., in such case, the inactive panel must first be activated by the UE before it can be used to transmit or receive a signal). However, activating an antenna panel may require time (which may be referred to as a panel activation delay), e.g., time to allow the UE to power on the antenna panel transceiver(s), allow circuits of the transceiver(s) or antenna panel to reach a steady-state, and/or time for the UE to apply a set of beam weights to the antenna panel. For example, as part of the panel activation delay, the circuits of the antenna panel transceivers, after receiving power, may require time to reach a steady-state (e.g., allow electric transients on the circuits or electronics of the antenna panel to settle to a steady-state), before the antenna panel can be used for beamforming. According to an example embodiment, this panel activation delay (or panel switching delay) should be accounted for or considered, and met by the BS resource scheduling, when considering timing (e.g., minimum latency) between transmission or reception of different signals using different panels (that may involve or require activating a previously inactive panel). Thus, in some cases, panel switching (switching between panels, or activating an inactive panel) may add significant delay or latency to a UE, e.g., prior to receiving or transmitting a signal via the newly activated panel.

Furthermore, UE antenna panels may be provided in other configurations than what is shown in FIG. 2. For example, separate or distinct UE antenna panels may be located on the various the sides (or different locations) of the UE, e.g., a first panel on one side, a second panel on another side of the UE, some other panels on other sides of the UE, where at least some of the panels may be pointed in a different direction or orientation. Thus, some panels may be more effective at transmitting and receiving some reference signals than others, since each panel may have a direction or orientation, which may or may not overlap with a direction a reference signal.

A UE may also measure a signal parameter (e.g., such as a reference signal received power (RSRP)) of each of a plurality of downlink references signals (e.g., such as synchronization signal block/SSB signals, or channel state information (CSI)-reference signals (CSI-RS)) received by the UE from the gNB/network node (or BS), where each reference signal may be transmitted by the gNB via a different gNB transmit beam (or via a different downlink DL reference signal). The UE may determine the strongest beams or reference signals (e.g., having a highest RSRP), and then may send a measurement report to the gNB that may identify the strongest N DL reference signals (or beams), and the RSRP (or other measured signal parameter) of these N beams, for example. The gNB may use this measurement report to determine what beam to use to communicate with the UE, for example.

In addition, transmission configuration indication (TCI) states may be used by a network node (gNB or BS) on PDCCH transmitted within a control resource set (or CORESET) resources to provide beam indications for the UE, which may identify a beam the UE should use for uplink communication and/or downlink communication with the network node or gNB. Each TCI state may be configured or associated with a transmit beam/receive beam pair. Thus, each TCI state may be associated with a particular beam or a specific reference signal. For example, TCI state 1 may be associated with (or may be used to indicate) CSI-RS #5, TCI state 2 may be associated with CSI-RS #9, etc., where CSI-RS #5, and CSI-RS #9 may be DL reference signals transmitted by the gNB. Thus, in this manner, each TCI state may be associated with a specific reference signal and/or a specific beam. For example, a UE may be configured by gNB via radio resource control (RRC) message with up to 64 or 128 candidate TCI states. Then, gNB may configure the UE with up to, e.g., 8 (or other number) activated TCI states via a MAC (media access control) control element (MAC CE) that may be piggy-backed (or appended to) a DL(downlink) data transmission to the UE via PDSCH (physical downlink shared channel). Thus, in this manner the gNB may send an activation message to activate (within the UE) the 8 indicated TCI states of, e.g., the 128 candidate TCI states. The UE may be requested by the network node to use a beam associated with any of these 8 (or other number) activated TCI states for communication with the network node or gNB. Then, more dynamically (e.g., such as provided within downlink control information/DCI of each subframe or slot), the gNB may indicate a selection of one of the activated TCI states for the UE to use for an uplink or downlink communication (e.g., for a scheduled UL or downlink communication). The DCI (which may, at least in some cases, identify a selected activated TCI state for the UE to use for a communication) may be provided within the PDCCH (physical downlink control channel) transmitted to the UE, e.g., as part of each slot or subframe. In this manner, in some cases, the DCI may be used to provide a fast beam indication, that indicates a selected TCI state (e.g., of a plurality of activated TCI states) that is associated with a reference signal or beam to be used by the UE for UL or DL communication with the network node (BS or gNB).

However, some issues may exist that may limit or negatively impact performance of the use of TCI states to indicate a beam for the UE to use for communication. For example, the use of different panels (with different orientations), and/or the use of different number of panels used for DL communication (DL reception of signals) and used for UL communication (UL transmission) may create issues or inconsistencies that may degrade beam performance for a UE.

For example, there may be different numbers of antenna panels at a UE that are available or activated for DL communication vs. those panels available or activated for UL communication. For example, a UE may typically include more DL panels (e.g., antenna panels configured or activated for DL reception of a signal) than UL panels (antenna panels that are configured for at least UL transmission of signals). Different panels may be used, at a particular time, for only downlink (DL) communication, for uplink (UL) and DL communication (available to switch back and forth), or for only UL communication. For example, with reference to FIG. 2, antenna panels 212, 214 and 216 may be used only for DL communication (DL receiving), while antenna panel 218 may be used for at least UL communication (either UL only, or UL and DL communication for panel 218). Thus, in this example, three antenna panels are used for DL communication, and 1 panel (at a time) is used for UL communication. Thus, an unbalanced number of UL panels vs. a number of DL panels may exist at a UE. Using multiple DL panels may increase the RSRP of a received/measured reference signal, which may not necessarily accurately reflect the suitability or strength of that same beam when used or generated by the UE for UL communication, since UL communication may often use a fewer number (e.g., one) of antenna panels as compared to the typically larger number of antenna panels for DL communication.

Also, the antenna panels may be directional, and thus, the antenna panels may be pointing in different directions or have different orientation. As a result, each panel may be able to receive only a subset of the DL reference signals (e.g., because each of the CSI-RS signals may be provided via a beam that points in a different direction). Thus, in some cases, different antenna panels, pointing in different directions, may only be able to receive a somewhat (or at least partially) different subset of DL reference signals. Or, in some cases, different antenna panels (e.g., having a different orientation in some cases) may measure a different RSRP of the same reference signal. Thus, measuring a DL reference signal via a beam with one panel that has one orientation, may not accurately reflect the strength of that same reference signal or beam when generated by a different panel of the UE that may have a different orientation. Thus, if a first antenna panel (or first set of panels) is used to measure a DL reference signal for a measurement report, but a second (or different) panel is used to apply a beam based on received TCI state for UL or DL communication, the performance of the beam (based on the received TCI state) may be degraded, or the indicated beam may be inappropriate for that antenna panel.

Also, in some cases, specific problems may arise when using measured DL reference signals to send measurement reports, and then the UE receiving activated TCI states (based on those measurement reports sent to the gNB) that may be used by the UE for UL communication. As noted, different panels (e.g., having different orientations) and/or different numbers of antenna panels at a UE may be used for UL communication vs. DL communication. Also, uplink beam based on a TCI state or beam may be impacted by a detected maximum power exposure (MPE) event, which may cause the UE to significantly decrease transmission power in one or more directions (e.g., for one or more TCI states or beams), based on a detected MPE (e.g., the user may be holding the UE next to his head or body), causing the UE to limit or decrease transmission time and/or transmission power in the beam directions toward the user, for example. Thus, for these reasons, one or more DL reference signals that are measured and reported has having a very high RSRP may not be good or suitable for UL transmission, e.g., since a different UL antenna panel may be used for the UL transmission, and/or a MPE event was detected for that beam or TCI state(s) in the direction of the reference signal, which may cause that TCI state(s) or associated reference signal or beam(s) to be unsuitable or far less desirable at that time for UL transmission.

As noted, a UE may be configured, e.g., via RRC message, with up to 128 candidate TCI states. UE can be activated via MAC CE with up to 8 of the candidate TCI states (gNB may indicate up to 8 activated TCI states). DCI within PDCCH can select any 1 of the 8 TCI beams without a long latency, since the DCI is provided within the PDCCH of each slot, for example. For example, a transmission that is performed using a fast beam indication may be transmitted in a same slot as the DCI with indication of a selected TCI state, or one or few slots later, as an illustrative example (e.g., where the UE data may be transmitted with a transmission latency less than a threshold of say, 5 slots, or less than 0.8 ms). Whereas, if the UE is unable to transmit based on the fast beam indication, such as due to a longer latency at the UE (such as due to a UE panel switching latency, e.g., based on UE's need to switch panels or activate another panel), then the UE may not be able to transmit until, say, 3 ms later (e.g., or around 24 slots later), for example, which may be considered a UE transmission latency that is longer than the latency threshold of, say, 0.8 ms or 5 slots. Thus, DCI may provide a relatively fast beam indication (indicating a selected activated TCI state for use by the UE for communication) for the UE, within or among the activated TCI states. However, the measurement reports based on the DL reference signals may use different panels, and/or different quantity of panels compared to a number of UL antenna panels. Also, MPEs detected by a UE may impact the TCI states or beams that may be effectively used for UL transmission. Also, in some cases, panel switching may be required, which may cause the UE transmission latency (e.g., delay in transmitting, after receiving the DCI) to be greater than a threshold latency, thereby preventing the UE from taking advantage of the fast beam indication provided to the UE via DCI, for example.

One possible approach may involve the UE performing panel switching to switch to a different panel (that may be able to more effectively transmit via the indicated TCI state/beam) based on the selected activated TCI state from the gNB. However, as noted, requiring the UE to perform panel switching in response to receiving an indication of a selected TCI state for UL or DL communication would not take advantage of fast beam indication provided via DCI, but rather, would introduce a significant transmission latency that is longer than a threshold, e.g., extending into a subsequent slot before the UE would be able to transmit, due to the delay to activate or switch to a different antenna panel.

Therefore, according to an example embodiment, one or more groups of activated TCI states may be provided by the gNB to the UE.

1) First group of activated TCI states that can be used for both UL transmission and DL reception by UE.
2) Second group of activated TCI states that can be used for only UL transmission by UE. Thus, the first group and/or second group may be indicated by a group of activated TCI states that can be used for at least UL transmission (and also possibly DL reception as well).
3) Third group of activated TCI states that can be used by UE for only DL reception.

In an example embodiment, the UE may measure and report DL reference signals using antennas associated with each (or one or more) groups. This may include one or more of: 1) UE measure and report DL reference signals for the first group (based on signals received via antenna panels that provide both UL transmission and DL reception), 2) UE measure and report DL reference signals for the second group (based on signals received via antenna panels that provide only UL transmission), and/or 3) measure and report DL reference signals for the third group (based on signals received via antenna panels that provide only DL reception). The measurement report for each (or one or more) of these groups may be divided into a plurality of subsets of reference signals, e.g., which may be an antenna-panel specific measurement and reporting, where each subset may be specific to or associated with an antenna panel or set of antenna panels of the UE. The measurement and report of subsets for a group that provides at least UL communication is described below with reference to FIG. 3.

For an antenna panel that is provided or configured (at that time) as an UL only antenna panel, there are several possibilities. First, the UL only panel may be omitted from the reception and measurement of DL signals for the DL panels. Also, the UL only panel may temporarily be permitted to receive DL reference signals (for reference signal measurement purposes for the UL only panel), and then, after receiving the DL reference signals via the UL only panel, the UE may be configured or activate the UL only UL only transmission for a period of time. Or, as another alternative, the UE may transmit UL reference signals (e.g., such as sounding reference signals (SRS)) to the gNB via the UL only antenna panel, to allow the gNB to measure RSRP of various UL reference signals from the UE. The gNB may then select a subset of the reference signals received by the gNB, and the gNB may send a MAC CE or other message to the UE to indicate to the UE a plurality of activated TCI states associated with this subset of reference signals, which are associated with the UL only antenna panel in this example. In this manner, the UE may obtain a plurality of activated TCI states associated with the UL only panel. The gNB may later indicate a selected TCI state, of the plurality of activated TCI states, associated with the UL only panel, for example. The UE may then transmit data via the UL only panel via a beam associated with the selected activated TCI state of the one or more activated TCI states that are associated with the UL only panel.

Figure 3:
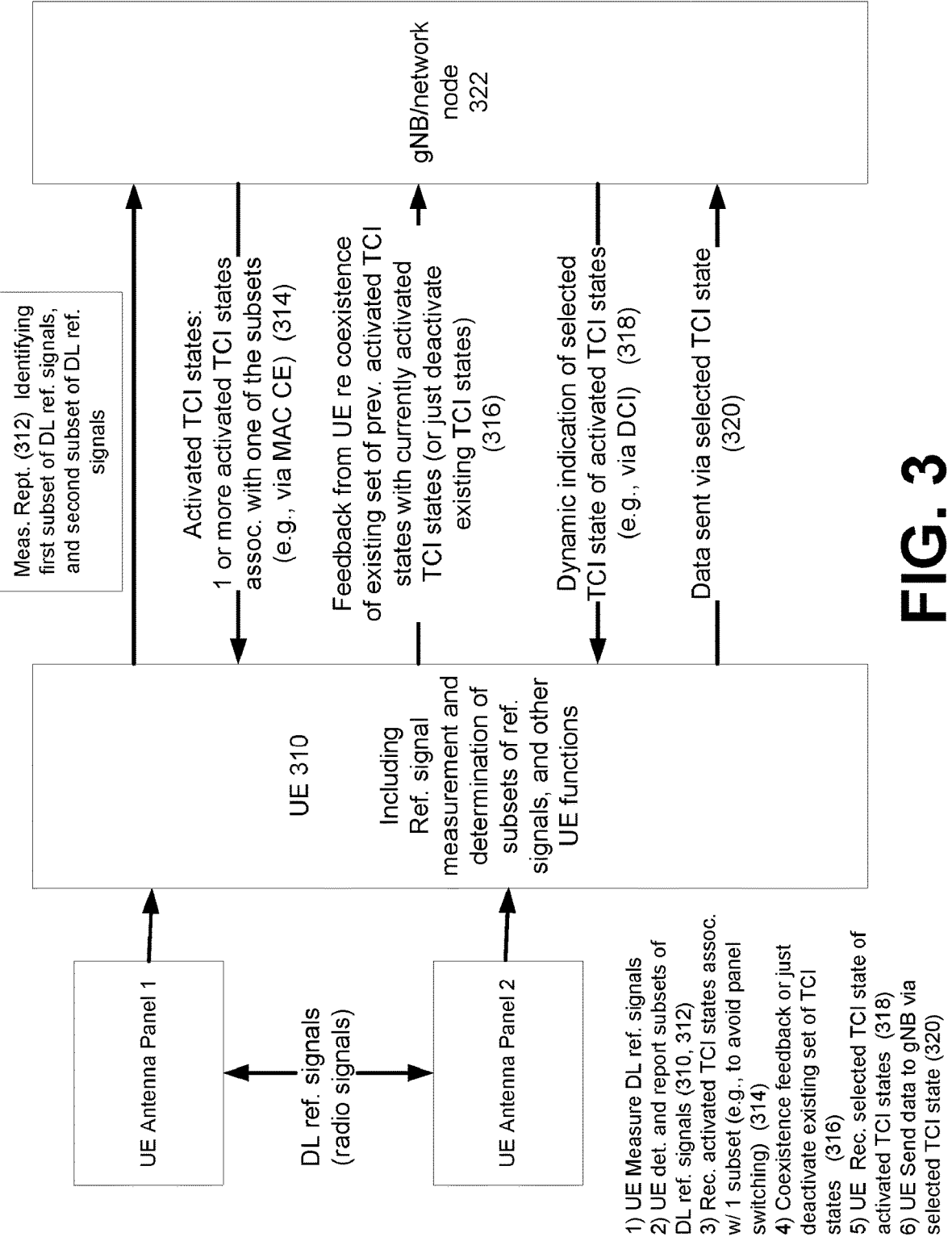
FIG. 3 is a diagram illustrating a system according to an example embodiment.

FIG. 3 is a diagram illustrating a system according to an example embodiment. A UE may include at least UE antenna panel 1 and UE antenna panel 2, and a UE reference signal measurement and subset determination block 310 (for measurement and determination of subsets of reference signals). The UE may be in communication with a gNB (or network node) 322.

At 1) of FIG. 3, radio signals for the plurality of DL reference signals are received by each of the UE antenna panels, including antenna panel 1 and antenna panel 2. These reference signals are associated with a group of transmission configuration indication (TCI) states or beams, that may be used for UL communication. Only 2 panels are shown, but any number may be provided. UE 310 may then measure a signal parameter (e.g., RSRP) of the received DL reference signals.

At 2) of FIG. 3, the UE 310 may determine a plurality of subsets of DL reference signals, e.g., wherein the TCI states associated with any one subset of the plurality of subsets of DL reference signals may be activated and used by the UE for UL transmission (e.g., without causing panel switching, or incurring a panel switching delay at the UE). Beams associated with some of these measured DL references may not be suitable (or may not be the best) for communication by the UE, such as for UL communication, for various reasons, such as low RSRP, impacted or limited by an MPE event in that beam direction, etc. Therefore, as part of determining each subset of the plurality of subsets, the UE may determine the best or most suitable reference signals for each of the plurality of subsets, out of the received and measured reference signals. Thus, each subset may include only some, or even a few in some cases, of the measured DL reference signals. For example, each subset of reference signals may be associated with (e.g., may be measured via) an antenna panel or a specific set of antenna panels.

Also, for example, in some cases, a panel ID (or a set of panel IDs) may be indicated for each subset when reporting each subset of the plurality of subsets of reference signals to the gNB. Or, in other cases, the panel-specific details and/or UE-specific details as to which panel(s) may be associated with which subsets may be unknown to the gNB (or transparent to the gNB), and not provided by the UE to the gNB, for example. In an illustrative example, it may be sufficient, at least in some cases, that the gNB knows that it may activate and select any of the TCI states associated with reference signals of (or within) a (or any one) subset, without causing a panel switching delay or without causing a transmission delay greater than a threshold (and therefore, allowing the UE to take advantage of the fast beam indication via DCI). In this manner, the UE may determine each subset of the plurality of subsets of reference signals, e.g., where each subset may be associated with a UE antenna panel or may be associated with a specific set of UE antenna panels (e.g., each per-panel subset of reference signals may be the best or strongest reference signals that were received and measured by the UE via the antenna panel, and also for example for an UL panel, which were not impacted or limited by MPE). Other factors or criteria may also be used to determine the subsets of reference signals.

The UE determination of the plurality of subsets of reference signals may be based on, the RSRP of the measured reference signals (e.g., to report the best reference signals), the antenna panel(s) that were used to measure the reference signals (e.g., each subset may be panel-specific), and/or MPE (maximum power exposure) event(s) that may be detected by the UE. For example, the determination of the subsets may include: identifying an antenna panel, of a plurality of antenna panels of the user device/UE, for which each of the plurality of downlink reference signals is associated; and, assigning each of the reference signals to one of the subsets, based on the antenna panel that the downlink reference signal is associated with. Or, the determination of the subsets may include selecting, by the user device (UE), a plurality of downlink reference signals that are received by one or more antenna panels of the user device that may be used for uplink transmission; and, assigning each of the selected downlink reference signals to a different subset, of the plurality of subsets, based on an antenna panel(s) that was used to measure the reference signal. Also, the selecting a plurality of downlink reference signals may include excluding, by the user device, from the selected plurality of downlink reference signals, any downlink reference signal having an associated beam for which the user device/UE has detected a maximum permissible exposure (MPE) event that would limit the ability of the user device to perform uplink transmission via the beam associated with the downlink reference signal. The determining (or determination) of the plurality of subsets may at least partially be based on maximum permissible exposure (MPE) limitations for the user device (or UE) with respect to one or more of the downlink reference signals or for beams associated with the downlink reference signals.

At 2) and at 312 of FIG. 3, the UE sends a measurement report that includes the plurality of subsets of DL reference signals, which may include, e.g., a first subset of reference signals (e.g., associated with or measured via antenna panel 1) and a second subset of reference signals (e.g., which may be associated with or measured via antenna panel 2). Therefore, each subset of reference signals may be panel-specific, or may be associated with an antenna panel or a set of antenna panels. Thus, for example, for each antenna panel (or for each set of antenna panels), a subset of reference signals may be selected or determined by the UE, based on the measured DL reference signals. In an illustrative example, the UE may determine a panel-specific subset of the best reference signals (e.g., for a panel that can be used for UL communication, the panel-specific subset may include reference signals measured via the panel, that have the highest RSRP, or having a RSRP above a threshold, and which (at least for a panel that may be used for UL transmission) are not limited or impacted by MPE). The UE may then report these subsets of reference signals to the gNB, e.g., which may include, for each subset: information identifying the subset (e.g., subset ID to identify the subset, or panel ID for panel associated with the subset), an identification of the reference signals of the subset (e.g., CSI-RS #2, CSI-RS #9, . . . ), and the RSRP (or other measured signal parameter) of each of the reference signals of the subset. With respect to FIGS. 3, at 3) and (314), the UE 310 may receive from the gNB 322 one or more activated TCI states associated with one (e.g., only one) subset (of the plurality of subsets), e.g., to avoid panel switching, and/or for the UE to avoid incurring a panel switching delay when receiving different selected activated TCI states within or associated with the same subset (314). The activated TCI states may be separately or individually indicated, or the gNB may indicate the subset ID or panel ID of the subset, to indicate that all TCI states associated with reference signals of the identified subset are being activated. For example, the one or more activated states associated with one (e.g., only one) of the subsets may be sent by gNB to the UE via a MAC control element that may be provided or appended to a data transmission via PDSCH (physical downlink shared channel), for example, or other message. For example, the reference signals of each subset may have been received via a same antenna panel or a same set of antenna panels (e.g., panel 1 for subset 1, and panel 2 for subset 2). Thus, any of the TCI states associated with one subset may be used for communication (e.g., UL commu-nication, or DL communication) using the same antenna (or set of antennas) that were used to measure such reference signals, and thus no panel switching is necessary, even though the gNB may select different activated TCI states associated with the one subset for use. For example, if CSI-RS #3, CSi-RS #4 and CSI-RS #6, CSI-RS #7 (among others) are measured by the UE via panel 1, and reported to the gNB as a first subset, and then a set of activated TCI states are indicated to the UE that include TCI states associated with only CSI-RS #3 and CSI-RS #4, then the UE may be able to transmit or receive a signal via a TCI state or beam associated with either CSI-RS #3 or CSI-RS #4 (any of the activated states associated with this subset) using the same antenna panel (antenna panel 1), since these reference signals of the subset were measured via antenna panel 1. Thus, for example, because these reference signals of the subset were measured and reported based on this panel as being good or even the best reference signals for this (e.g., panel-specific) subset, it can be assumed that this panel has a correct or appropriate direction or orientation for commu-nication of beams associated with this subset and/or there are no MPE issues for these reported reference signals within the subset, and thus, the UE may be able to commu-nicate (e.g., transmit or receive) via beams of the TCI states associated with the subset with this same panel, and without needing to switch to a different antenna panel. Thus, signals can be received and/or transmitted by the UE via the same beams of the activated TCI states using the same antenna panel (panel 1) (the antenna panel at the UE that was used to measure the reference signals CSI-RS #3, CSI-RS #4 of the subset) in a manner that was indicated by the measure-ment reports (e.g., with sufficient strength or power or RSRP, and/or without being impacted by an MPE).

At 4) and 316 of FIG. 3, the UE, in some cases or for some configurations, may provide coexistence feedback to the gNB 322 indicating whether an existing set of (previously) activated TCI states for the UE may coexist with the currently activated set of TCI states (just received from the gNB). If the (or any of the) existing set of activated TCI states are associated with a different antenna panel than the currently activated set of TCI states, then the existing activated TCI states cannot remain as active (they cannot coexist with the currently activated TCI states), because panel switching would be required to make use of all of these activated TCI states, as they are associated with multiple antenna panels. And, as noted, to decrease trans-mission latency for the UE, it is desirable to avoid panel switching and panel switching delay that might occur when the gNB may (for a first slot) select one of the existing TCI states for use (e.g., associated with panel 2), and then (e.g., for next slot, or a few slots later) select one of the currently (or newly) activated TCI states (e.g., associated with panel 1), since this would require panel switching from panel 2 to panel 1 (and activating panel 1), which would cause a panel switching latency at the UE before the UE could commu-nicate using the TCI state of the current set of activated TCI states. Thus, for example, in order to avoid UE panel switching, the UE may, for example, either: 1) always (as a default) (UE and gNB) deactivating the existing set of previously activated set of TCI states, upon arrival or receipt of a new set of activated TCI states; or 2) requiring the UE to determine if the existing activated TCI states and current or new activated TCI states can coexist, and if not, then the UE sending feedback to the gNB indicating the lack of coexistence or indicating that the existing activated TCI states are deactivated (and thus the gNB cannot select one of these deactivated TCI states for the UE to use for UL or DL communication).

At 4) of FIG. 3, as one possibility, the UE may (e.g., as a default without use of feedback from the UE) deactivate, the existing set of previously activated TCI states at least for uplink communication, in response to receiving the message activating one or more of the TCI states associated with one subset of the downlink reference signals.

Also at 4) of FIG. 3, as an alternative to using the default deactivation of previously activated TCI states, the UE may send coexistence feedback, which may be provided as (for example): determining, by the user device, an existing set of previously activated TCI states for at least uplink commu-nication; and determining, by the user device, whether or not the existing set of previously activated set of TCI states at the user device at least for uplink communication can coexist with the one or more currently activated TCI states associated with the one subset.

At 4) of FIG. 3, as another possibility, the UE may, for example, send to the network node, information (or feed-back) indicating whether or not the existing set of previously activated set of TCI states at the user device can coexist with the one or more currently activated TCI states. Thus, for example, the UE may send, as coexistence feedback to the gNB, either 1) an indication to deactivate the existing set of previously activated set of TCI states because the existing set of previously activated set of TCI states at the user device for uplink communications cannot coexist with the one or more currently activated TCI states; or 2) an indication to maintain activation of the existing set of previously acti-vated set of TCI states for uplink communications, in addition to the one or more currently activated TCI states because the existing set of previously activated set of TCI states at the UE (or user device) can coexist with the one or more currently activated TCI states (e.g., these are all associated with the same antenna panel or the same subset of antenna panels).

At 5) and (318) of FIG. 3, the UE (or user device) may receive, from the gNB 322 (or network node), information identifying a selected TCI state of the one or more activated TCI states, to be used for uplink transmission (or DL reception). At 6) and (320) of FIG. 3, the UE may then transmit, to the gNB 322 or network node, data via a transmit beam associated with the selected activated TCI state.

FIG. 4 is a diagram illustrating operation of a user device according to an example embodiment. In the diagram of FIG. 4, a groups of activated TCI states is provided by the gNB to the UE based on a measurement report received by the gNB from the UE. In the example shown in FIG. 4, the activated set of TCI states are provided for the UE for at least UL transmission, which may include either UL only trans-mission, or both UL transmission and DL reception. Thus, the operation of FIG. 4 may be applied to the: 1) First group of activated TCI states that can be used for both UL transmission and DL reception by UE; and/or 2) Second group of activated TCI states that can be used for only UL transmission by UE. Thus, the first group and/or second group may be indicated by a group of activated TCI states that can be used for at least UL transmission (and also possibly DL reception as well). Although not shown in FIG. 4, a similar operation to that shown in FIG. 4 may be performed for 3) the third group of activated TCI states used for DL only communication (e.g., since not all UE antenna panels maybe configured or available for DL reception of signals, and thus, it may be useful to provide subsets, such as panel-specific subsets, of reference signals to the gNB even for the DL only situation).

Referring to FIG. 4, at 410, the UE may send capabilities information to the gNB, e.g., which may include a number of groups, and/or an indication of which groups are supported by the UE, e.g., which may include at least an UL group (for this example), a number of subsets and/or a number of panels for that group, and a number of activated states per subset that are supported by the UE. At 412, the UE receives from the gNB the group(s), number of subsets and/or numbers of activated TCI states per subset that will be provided by the gNB, based on UE capabilities. For example, the gNB may indicate to the UE that two subsets (e.g., two panel-specific subsets of reference signals) for the at least UL group of TCI states, with 8 activated TCI states per subset will be used.

At 414, the UE may receive a reference signal measurement configuration from the gNB that may indicate what/which reference signals to measure, and what signal parameter to measure, and/or other measurement configuration information. The UE may measure DL reference signals received for each of the two subsets that have been configured via an associated antenna panel, e.g., panel 1 and panel 2. The UE may then determine the subsets of DL reference signals to be reported, for the subset 1 (associated with antenna panel 1 in this example) and subset 2 (associated with UE antenna panel 2 in this example). The best or strongest DL reference signals received for each panel are determined and reported. For example, based on all the reference signals measured via panel 1, CSI-RS #1, CSI-RS #2, and CSI-RS #7 are determined to be the strong and are not impacted by MPE. Thus, subset 1 (associated with panel 1) may include CSI-RS #1, CS-RS #2, and CSI-RS #7. Similarly, the UE may determine the best or strongest reference signals measured via antenna panel 2 for subset 2. For example, based on the measured reference signals received via panel 2, the subset 2 (associated with panel 2) may include CSI-RS #4, CS-RS #4, and CSI-RS #9. Thus, the measurement report sent by the UE may be organized to indicate each subset of a plurality of subsets of reference signals, so that the UE informs the gNB of which TCI states can be activated and used without requiring the UE to perform panel switching and/or incurring a transmission latency or panel switching latency, which may delay transmission of data beyond a threshold latency. Thus, the UE measurement report sent to the gNB may indicate for each subset (e.g., for subset 1 and subset 2), a subset ID or panel ID for the subset, information identifying the reference signals for each subset, and the measured signal parameter (e.g., RSRP) of each reported reference signal, for example.

At 416, the UE may receive an indication of one or more activated TCI states that are associated with only one of the subsets. For example, the gNB may indicate subset 1, which may activate all the TCI states associated with the reference signals of subset 1 (CSI-RS #1, CS-RS #2, and CSI-RS #7). Or, the activation message may indicate specifically which TCI states are activated, e.g., the activation message received by the UE from the gNB may indicate only CSI-RS #1, CS-RS #2 (which are associated with subset 1) as being activated TCI states.

Also, at 416, coexistence issues may be considered by the UE. As one possibility, the UE may deactivate existing TCI states that were previously activated, e.g., in response to an activation message that activates a new or current set of TCI states. Or, as another option, flow may proceed to 418, where the UE may determine whether the existing activated TCI states that were previously activated can coexist with the new or current set of activated TCI states, and then the UE may send coexistence feedback to the gNB accordingly. If the existing activated TCI states cannot coexist (e.g., two sets of activated states may be provided on separate antenna panels, or coexistence may require panel switching), then the UE may send a message to the gNB indicating deactivation of the existing set of activated TCI states. Otherwise, the UE may send the gNB a message indication that the existing set of activated TCI states will remain active or can coexist with the current or new set of activated TCI states. At 420, the UE determines the total or complete set of activated TCI states, which will include at least the current or new set of activated TCI states, and may also include the existing set of activated TCI states, if they can coexist, for example. At 422, the UE may assume that any of the activated TCI states can be selected for use. At 424, the UE receives a beam or TCI state indication, e.g., via DCI, that indicates a selected TCI state among the one or more activated TCI states of one subset, for example. Thus, in this example, the UE may then transmit data via a beam associated with the selected TCI state, e.g., without requiring panel switching, for example.

Example 1. FIG. 5 is a flow chart illustrating operation of a user device (or UE) according to an example embodiment. Operation 510 includes measuring, by a user device in a wireless network, a plurality of downlink reference signals received from a network node, wherein the plurality of downlink reference signals are associated with a group of transmission configuration indication (TCI) states that may be used at least for uplink communication by the user device. Operation 520 includes determining, by the user device based at least on the measuring, a plurality of subsets of the downlink reference signals, wherein the TCI states associated with any one subset of the plurality of subsets of downlink reference signals may be activated at a time by the user device for uplink transmission. And, operation 530 includes sending, by the user device to the network node, a measurement report that indicates one or more downlink reference signals for each subset of the plurality of subsets.

Example 2. The method of Example 1, further comprising: receiving, by the user device from the network node, a message activating one or more of the TCI states associated with one subset, of the plurality of subsets, of the downlink reference signals.

Example 3. The method of Example 2, further comprising: receiving, by the user device from the network node, information identifying a selected TCI state of the one or more activated TCI states, to be used for uplink transmission; and transmitting, by the user device to the network node, data via a transmit beam associated with the selected TCI state.

Example 4. The method of Example 3, further comprising at least one of: wherein the TCI states associated with any one subset of the plurality of subsets of downlink reference signals may be activated at a time by the user device for uplink transmission to avoid a possibility that the user device will incur an additional transmission latency that is greater than a threshold; wherein the TCI states associated with any one subset of the plurality of subsets of downlink reference signals may be activated at a time by the user device for uplink transmission to prevent the user device from incurring a transmission latency, after receiving information identifying a selected TCI state for uplink transmission, that is greater than a threshold; wherein the user device transmits the data via an uplink beam associated with the selected TCI state within a threshold latency after receiving the indication of the selected TCI state, based on the user device activating only one subset of the plurality of subsets of downlink reference signals at a time; wherein successive uplink transmissions by the user device using beams associated with TCI states associated with different subsets will cause the user device to incur a transmission latency that is greater than a threshold latency; and/or wherein the user device may transmit data using a beam of any activated TCI state, associated with only one subset of the plurality of subsets, within a threshold period of time.

Example 5. The method of any of Examples 1-4, wherein each subset, of the plurality of subsets of downlink reference signals is associated with, or was measured with, a different antenna panel of the user device that is available for uplink transmission.

Example 6. The method of any of Examples 1-5, wherein each subset of the plurality of subsets is associated with a different set of one or more antenna panels that are assigned or allocated at that time at least for uplink transmission, wherein a use of beams of different TCI states associated with different subsets of downlink reference signals requires the user device to perform a switching between antenna panels before performing uplink transmission, and causing the user device to incur a transmission latency that is greater than a threshold.

Example 7. The method of any of Examples 1-6, wherein any of the TCI states associated with any one subset, of the plurality of subsets, may be activated and used by the user device for uplink transmission without causing the user device to perform antenna panel switching or without causing the user device to incur a panel switching delay for the uplink transmission.

Example 8. The method of any of Examples 3-7, wherein any of the activated TCI states associated with a subset, of the plurality of subsets of downlink reference signals, may be selected and used for uplink transmission without requiring the user device to perform antenna panel switching.

Example 9. The method of any of Examples 1-8, wherein the determining comprises: identifying an antenna panel, of a plurality of antenna panels of the user device, for which each of the plurality of downlink reference signals is associated; assigning each of the reference signals to one of the subsets, based on the antenna panel that the downlink reference signal is associated with.

Example 10. The method of any of Examples 1-9, wherein the determining comprises: selecting, by the user device, a plurality of downlink reference signals that are received by one or more antenna panels of the user device that may be used for uplink transmission; assigning each of the selected downlink reference signals to a different subset, of the plurality of subsets, based on an antenna panel(s) that was used to measure the reference signal.

Example 11. The method of Example 10 wherein the selecting a plurality of downlink reference signals further comprises: excluding, by the user device, from the selected plurality of downlink reference signals, any downlink reference signal having an associated beam for which the user device has detected a maximum permissible exposure (MPE) event that would limit the ability of the user device to perform uplink transmission via a beam associated with a downlink reference signal.

Example 12. The method of any of Examples 1-11, wherein the determining of the plurality of subsets is at least partially based on maximum permissible exposure (MPE) limitations for the user device with respect to one or more of the downlink reference signals or for beams associated with the downlink reference signals.

Example 13. The method of any of Examples 2-12, further comprising: deactivating, by the user device, an existing set of previously activated TCI states at least for uplink communication, in response to receiving the message activating one or more of the TCI states associated with one subset of the downlink reference signals.

Example 14. The method of any of Examples 2-13, wherein the activated TCI states comprise a currently activated TCI states, the method further comprising: determining, by the user device, an existing set of previously activated TCI states for at least uplink communication; and determining, by the user device, whether or not the existing set of previously activated set of TCI states at the user device at least for uplink communication can coexist with the one or more currently activated TCI states associated with the one subset.

Example 15. The method of Example 14, further comprising: sending, by the user device to the network node, information indicating whether or not the existing set of previously activated set of TCI states at the user device can coexist with the one or more currently activated TCI states.

Example 16. The method of Example 14, further comprising: sending, by the user device to the network node, information indicating either: an indication to deactivate the existing set of previously activated set of TCI states because the existing set of previously activated set of TCI states at the user device for uplink communications cannot coexist with the one or more currently activated TCI states; or an indication to maintain activation of the existing set of previously activated set of TCI states for uplink communications, in addition to the one or more currently activated TCI states because the existing set of previously activated set of TCI states at the user device can coexist with the one or more currently activated TCI states.

Example 17. The method of any of Examples 1-16, wherein: the TCI states associated with any one subset of the plurality of subsets of downlink reference signals may be activated only for uplink transmission; or the TCI states associated with any one subset of the plurality of subsets of downlink reference signals may be activated for uplink transmission and/or downlink transmission.

Example 18. An apparatus comprising means for performing the method of any of Examples 1-17.

Example 19. A non-transitory computer-readable storage medium comprising instructions stored thereon that, when executed by at least one processor, are configured to cause a computing system to perform the method of any of Examples 1-17.

Example 20. An apparatus comprising: at least one processor; and at least one memory including computer program code; the at least one memory and the computer program code configured to, with the at least one processor, cause the apparatus at least to perform the method of any of Examples 1-17.

Example 21. FIG. 6 is a flow chart illustrating operation of a network node (e.g., gNB or BS) according to an example embodiment. Operation 610 includes receiving, by a network node from a user device to, a measurement report that indicates one or more downlink reference signals for each subset of a plurality of subsets of downlink reference signal, wherein the plurality of downlink reference signals are associated with a group of transmission configuration indication (TCI) states that may be used at least for uplink communication by the user device, and wherein the TCI states associated with any one subset of the plurality of subsets of downlink reference signals may be activated at a time by the user device for uplink transmission. Operation 620 includes sending, by the network node to the user device from, a message activating one or more of the TCI states associated with one subset, of the plurality of subsets, of the downlink reference signals. Operation 630 includes sending, by the network node to the user device, information identifying a selected TCI state of the one or more activated TCI states, to be used for uplink transmission. And, operation 640 includes receiving, by the network node from the user device, data via a transmit beam associated with the selected TCI state.

Example 22. The method of Example 21, wherein the one or more activated TCI states comprise one or more currently activated TCI states, the method further comprising: receiving, by the network node from the user device, information indicating whether or not an existing set of previously activated set of TCI states at the user device can coexist with the one or more currently activated TCI states.

Example 23. The method of Example 21, wherein the one or more activated TCI states comprise one or more currently activated TCI states, the method further comprising: receiving, by the network node from the user device, information indicating either: an indication to deactivate the existing set of previously activated set of TCI states because the existing set of previously activated set of TCI states at the user device for uplink communications cannot coexist with the one or more currently activated TCI states; or an indication to maintain activation of the existing set of previously activated set of TCI states for uplink communications, in addition to the one or more currently activated TCI states because the existing set of previously activated set of TCI states at the user device can coexist with the one or more currently activated TCI states.

Example 24. The method of any of Examples 21-23, wherein: the TCI states associated with any one subset of the plurality of subsets of downlink reference signals may be activated by the user device only for uplink transmission; or the TCI states associated with any one subset of the plurality of subsets of downlink reference signals may be activated by the user device for uplink transmission and/or downlink transmission.

Example 25. An apparatus comprising means for performing the method of any of Examples 21-24.

Example 26. A non-transitory computer-readable storage medium comprising instructions stored thereon that, when executed by at least one processor, are configured to cause a computing system to perform the method of any of Examples 21-24.

Example 27. An apparatus comprising: at least one processor; and at least one memory including computer program code; the at least one memory and the computer program code configured to, with the at least one processor, cause the apparatus at least to perform the method of any of Examples 21-24.

Figure 7:
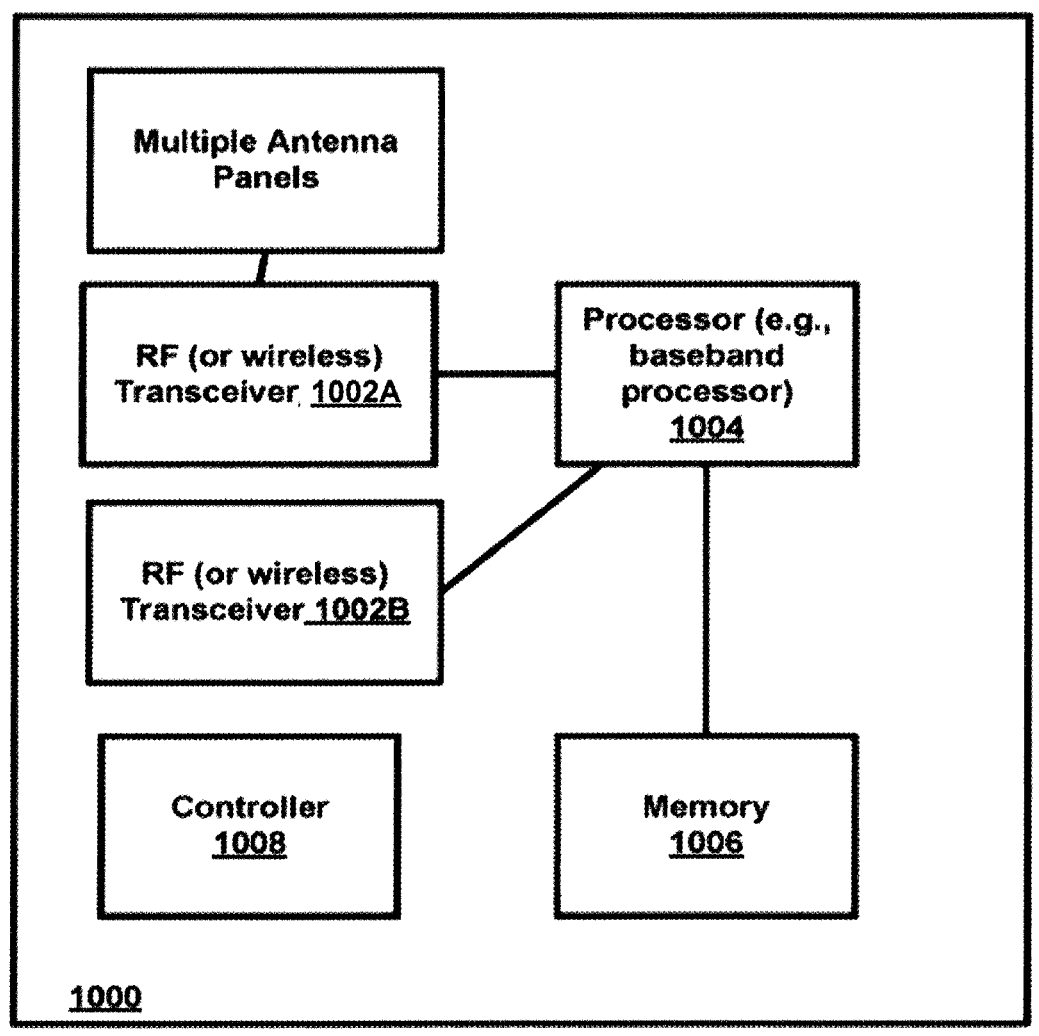
FIG. 7 is a block diagram of a wireless station (e.g., AP, BS, RAN node, UE or user device, or other network node) according to an example embodiment.

FIG. 7 is a block diagram of a wireless station (e.g., AP, BS or user device/UE, or other network node) 1000 according to an example embodiment. The wireless station 1000 may include, for example, one or more (e.g., two as shown in FIG. 7) RF (radio frequency) or wireless transceivers 1002A, 1002B, where each wireless transceiver includes a transmitter to transmit signals and a receiver to receive signals. The wireless station also includes a processor or control unit/entity (controller) 1004 to execute instructions or software and control transmission and receptions of signals, and a memory 1006 to store data and/or instructions.

Processor 1004 may also make decisions or determinations, generate frames, packets or messages for transmission, decode received frames or messages for further processing, and other tasks or functions described herein. Processor 1004, which may be a baseband processor, for example, may generate messages, packets, frames or other signals for transmission via wireless transceiver 1002 (1002A or 1002B). Processor 1004 may control transmission of signals or messages over a wireless network, and may control the reception of signals or messages, etc., via a wireless network (e.g., after being down-converted by wireless transceiver 1002, for example). Processor 1004 may be programmable and capable of executing software or other instructions stored in memory or on other computer media to perform the various tasks and functions described above, such as one or more of the tasks or methods described above. Processor 1004 may be (or may include), for example, hardware, programmable logic, a programmable processor that executes software or firmware, and/or any combination of these. Using other terminology, processor 1004 and transceiver 1002 together may be considered as a wireless transmitter/receiver system, for example.

In addition, referring to FIG. 7, a controller (or processor) 1008 may execute software and instructions, and may provide overall control for the station 1000, and may provide control for other systems not shown in FIG. 7, such as controlling input/output devices (e.g., display, keypad), and/or may execute software for one or more applications that may be provided on wireless station 1000, such as, for example, an email program, audio/video applications, a word processor, a Voice over IP application, or other application or software.

In addition, a storage medium may be provided that includes stored instructions, which when executed by a controller or processor may result in the processor 1004, or other controller or processor, performing one or more of the functions or tasks described above.

According to another example embodiment, RF or wireless transceiver(s) 1002A/1002B may receive signals or data and/or transmit or send signals or data. Processor 1004 (and possibly transceivers 1002A/1002B) may control the RF or wireless transceiver 1002A or 1002B to receive, send, broadcast or transmit signals or data.

The embodiments are not, however, restricted to the system that is given as an example, but a person skilled in the art may apply the solution to other communication systems. Another example of a suitable communications system is the 5G concept. It is assumed that network architecture in 5G will be quite similar to that of the LTE-advanced. 5G is likely to use multiple input—multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks will most probably utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent.

Embodiments of the various techniques described herein may be implemented in digital electronic circuitry, or in computer hardware, firmware, software, or in combinations of them. Embodiments may be implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Embodiments may also be provided on a computer readable medium or computer readable storage medium, which may be a non-transitory medium. Embodiments of the various techniques may also include embodiments provided via transitory signals or media, and/or programs and/or software embodiments that are downloadable via the Internet or other network(s), either wired networks and/or wireless networks. In addition, embodiments may be provided via machine type communications (MTC), and also via an Internet of Things (IOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, embodiments of the various techniques described herein may use a cyber-physical system (CPS) (a system of collaborating computational elements controlling physical entities). CPS may enable the embodiment and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various embodiments of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer, chip or chipset. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, embodiments may be implemented on a computer having a display device, e.g., a cathode ray tube (CRT) or liquid crystal display (LCD) monitor, for displaying information to the user and a user interface, such as a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments may be implemented in a computing system that includes a back-end component, e.g., as a data server, or that includes a middleware component, e.g., an application server, or that includes a front-end component, e.g., a client computer having a graphical user interface or a Web browser through which a user can interact with an embodiment, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described embodiments have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

The invention claimed is:
1. An apparatus comprising:
at least one processor; and
at least one memory including computer program code;
the at least one memory and the computer program code configured to, with the at least one processor, cause the apparatus at least to:
measure a plurality of downlink reference signals received from a network node, wherein the plurality of downlink reference signals are associated with a group of transmission configuration indication (TCI) states;

determine, based at least on the measuring, a plurality of subsets of the downlink reference signals, wherein the TCI states associated with at least a first subset of the plurality of subsets of downlink reference signals may be activated at a time by the apparatus for uplink transmission and the TCI states associated with at least a second subset of the plurality of subsets of downlink reference signals may be activated at a time by the apparatus for downlink reception;

send, to a network node, a measurement report that indicates one or more downlink reference signals for each subset of the plurality of subsets;

receive, from the network node, a message activating one or more of the TCI states associated with the first subset, of the plurality of subsets, of the downlink reference signals;

receive, from the network node, information identifying a selected TCI state of the one or more activated TCI states, to be used for uplink transmission; and transmit, to the network node, data via a transmit beam associated with the selected TCI state.

2. The apparatus of claim 1, wherein at least one of:

the TCI states associated with the first subset of the plurality of subsets of downlink reference signals may be activated at a time by the apparatus for uplink transmission to avoid a possibility that the apparatus will incur an additional transmission latency that is greater than a threshold;

the TCI states associated with the first subset of the plurality of subsets of downlink reference signals may be activated at a time by the apparatus for uplink transmission to prevent the apparatus from incurring a transmission latency, after receiving information identifying a selected TCI state for uplink transmission, that is greater than a threshold;

the apparatus transmits the data via an uplink beam associated with the selected TCI state within a threshold latency after receiving the indication of the selected TCI state;

successive uplink transmissions by the apparatus using beams associated with TCI states associated with different subsets will cause the apparatus to incur a transmission latency that is greater than a threshold latency; or the apparatus may transmit data using a beam of any activated TCI state, associated with only one subset of the plurality of subsets, within a threshold period of time.

3. The apparatus of claim 1, wherein each subset, of the plurality of subsets of downlink reference signals is associated with, or was measured with, a different antenna panel of the apparatus, wherein the first subset is associated with, or was measured with, a first antenna panel that is available for uplink transmission and the second subset is associated with, or was measured with, a second antenna panel that is available for downlink reception.

4. The apparatus of claim 1, wherein at least two subset of the plurality of subsets is associated with a different set of one or more antenna panels that are assigned or allocated at that time at least for uplink transmission, wherein a use of beams of different TCI states associated with different subsets of downlink reference signals requires the apparatus to perform a switching between antenna panels before performing uplink transmission, and causing the apparatus to incur a transmission latency that is greater than a threshold.

5. The apparatus of claim 1, wherein any of the TCI states associated with at least the first subset, of the plurality of subsets, may be activated and used by the apparatus for uplink transmission without causing the apparatus to perform antenna panel switching or without causing the apparatus to incur a panel switching delay for the uplink transmission.

6. The apparatus of claim 1, wherein the determining comprises: identifying an antenna panel, of a plurality of antenna panels of the apparatus, for which each of the plurality of downlink reference signals is associated;

assigning each of the reference signals to one of the subsets, based on the antenna panel that the downlink reference signal is associated with.

7. The apparatus of claim 1, wherein the determining comprises:

selecting a plurality of downlink reference signals that are received by one or more antenna panels that may be used for uplink transmission;

assigning each of the selected downlink reference signals to a different subset, of the plurality of subsets, based on an antenna panel(s) that was used to measure the reference signal.

8. The apparatus of claim 7, wherein the selecting a plurality of downlink reference signals further comprises:

excluding from the selected plurality of downlink reference signals, any downlink reference signal having an associated beam for which the apparatus has detected a maximum permissible exposure event that would limit the ability of the apparatus to perform uplink transmission via a beam associated with a downlink reference signal.

9. The apparatus of claim 1, wherein the determining of at least the first subset is at least partially based on maximum permissible exposure limitations for the apparatus with respect to one or more of the downlink reference signals or for beams associated with the downlink reference signals.

10. The apparatus of claim 1, wherein the at least one memory and the computer program code further configured to, with the at least one processor, cause the apparatus at least to:

deactivate an existing set of previously activated TCI states at least for uplink communication, in response to receiving the message activating one or more of the TCI states associated with the first subset of the downlink reference signals.

11. The apparatus of claim 1, wherein the activated TCI states comprise a currently activated TCI states, and wherein the at least one memory and the computer program code further configured to, with the at least one processor, cause the apparatus at least to:

determine an existing set of previously activated TCI states for at least uplink communication; and determine whether or not the existing set of previously activated set of TCI states at the apparatus at least for uplink communication can coexist with the one or more currently activated TCI states associated with at least the first subset.

12. The apparatus of claim 11, wherein the at least one memory and the computer program code further configured to, with the at least one processor, cause the apparatus at least to:

send, to the network node, information indicating whether or not the existing set of previously activated set of TCI states at the apparatus can coexist with the one or more currently activated TCI states.

13. The apparatus of claim 11, wherein the at least one memory and the computer program code further configured to, with the at least one processor, cause the apparatus at least to send, to the network node, information indicating:

an indication to deactivate the existing set of previously activated set of TCI states because the existing set of previously activated set of TCI states at the apparatus for uplink communications cannot coexist with the one or more currently activated TCI states; or an indication to maintain activation of the existing set of previously activated set of TCI states for uplink communications, in addition to the one or more currently activated TCI states because the existing set of previously activated set of TCI states at the apparatus can coexist with the one or more currently activated TCI states.

14. The apparatus of claim 1, wherein:

the TCI states associated with at least the first subset of the plurality of subsets of downlink reference signals may be activated only for uplink transmission; or the TCI states associated with at least the second subset of the plurality of subsets of downlink reference signals may be activated only for downlink reception.

15. An apparatus comprising:

at least one processor; and at least one memory including computer program code;

the at least one memory and the computer program code configured to, with the at least one processor, cause the apparatus at least to:

receive, from a user device, a measurement report that indicates one or more downlink reference signals for at least a first subset of a plurality of subsets of downlink reference signals and for at least a second subset of a plurality of subsets of downlink reference signals, wherein the plurality of downlink reference signals of the first subset are associated with a group of transmission configuration indication (TCI) states that may be used at least for uplink communication by the user device, and wherein the plurality of downlink reference signals of the second subset are associated with a group of TCI states that may be used at least for downlink communication to the user device, and wherein the TCI states associated with any one subset of the plurality of subsets of downlink reference signals may be activated at a time by the user device;

send, to the user device, a message activating one or more of the TCI states associated with the first subset, of the plurality of subsets, of the downlink reference signals;

send, to the user device, information identifying a selected TCI state of the one or more activated TCI states, to be used for uplink transmission; and receive, from the user device, data via a transmit beam associated with the selected TCI state.

16. The apparatus of claim 15, wherein the one or more activated TCI states comprise one or more currently activated TCI states, and wherein the at least one memory and the computer program code further configured to, with the at least one processor, cause the apparatus at least to:

receive, from the user device, information indicating whether or not an existing set of previously activated set of TCI states at the user device can coexist with the one or more currently activated TCI states.

17. The apparatus of claim 15, wherein the one or more activated TCI states comprise one or more currently activated TCI states, and wherein the at least one memory and the computer program code further configured to, with the at least one processor, cause the apparatus at least to receive, from the user device, information indicating either:

an indication to deactivate the existing set of previously activated set of TCI states because the existing set of previously activated set of TCI states at the user device for uplink communications cannot coexist with the one or more currently activated TCI states; or an indication to maintain activation of the existing set of previously activated set of TCI states for uplink communications, in addition to the one or more currently activated TCI states because the existing set of previously activated set of TCI states at the user device can coexist with the one or more currently activated TCI states.

18. The apparatus of claim 15, wherein:

the TCI states associated with at least the first subset of the plurality of subsets of downlink reference signals may be activated by the user device only for uplink transmission; or the TCI states associated with at least the second subset of the plurality of subsets of downlink reference signals may be activated by the user device only for downlink reception.

19. A method for a user device comprising:

measuring a plurality of downlink reference signals received from a network node, wherein the plurality of downlink reference signals are associated with a group of transmission configuration indication (TCI) states;

determining, based at least on the measuring, a plurality of subsets of the downlink reference signals, wherein the TCI states associated with at least a first subset of the plurality of subsets of downlink reference signals may be activated at a time by the user device for uplink transmission and the TCI states associated with at least a second subset of the plurality of subsets of downlink reference signals may be activated at a time by the user device for downlink reception;

sending, to the network node, a measurement report that indicates one or more downlink reference signals for each subset of the plurality of subsets;

receiving, from the network node, a message activating one or more of the TCI states associated with the first subset, of the plurality of subsets, of the downlink reference signals;

receiving, from the network node, information identifying a selected TCI state of the one or more activated TCI states, to be used for uplink transmission; and transmitting, to the network node, data via a transmit beam associated with the selected TCI state.

20. The method of claim 19, wherein at least one of:

the TCI states associated with the first subset of the plurality of subsets of downlink reference signals may be activated at a time by the user device for uplink transmission to avoid a possibility that the user device will incur an additional transmission latency that is greater than a threshold;

the TCI states associated with the first subset of the plurality of subsets of downlink reference signals may be activated at a time by the user device for uplink transmission to prevent the user device from incurring a transmission latency, after receiving information identifying a selected TCI state for uplink transmission, that is greater than a threshold;

the user device transmits the data via an uplink beam associated with the selected TCI state within a threshold latency after receiving the indication of the selected TCI state;

successive uplink transmissions by the user device using beams associated with TCI states associated with different subsets will cause the user device to incur a transmission latency that is greater than a threshold latency; or the user device may transmit data using a beam of any activated TCI state, associated with only one subset of the plurality of subsets, within a threshold period of time.

\* \* \* \* \*